United States Patent
Idaka

(10) Patent No.: US 10,728,454 B2
(45) Date of Patent: Jul. 28, 2020

(54) IMAGING APPARATUS CONFIGURED TO PERFORM IMAGE STABILIZATION AND CONTROL METHOD THEREOF

(71) Applicant: CANON KABUSHIKI KAISHA, Tokyo (JP)

(72) Inventor: Sayuri Idaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/188,827

(22) Filed: Nov. 13, 2018

(65) Prior Publication Data
US 2019/0158745 A1 May 23, 2019

(30) Foreign Application Priority Data
Nov. 20, 2017 (JP) .................... 2017-222883

(51) Int. Cl.
*H04N 5/228* (2006.01)
*H04N 5/232* (2006.01)

(52) U.S. Cl.
CPC ....... *H04N 5/23264* (2013.01); *H04N 5/2328* (2013.01); *H04N 5/23216* (2013.01); *H04N 5/23229* (2013.01); *H04N 5/23258* (2013.01); *H04N 5/23261* (2013.01); *H04N 5/23299* (2018.08)

(58) Field of Classification Search
CPC ........... H04N 5/23216; H04N 5/23229; H04N 5/23264; H04N 5/23261

USPC ........................................ 348/208.4
See application file for complete search history.

(56) References Cited

U.S. PATENT DOCUMENTS

2002/0102100 A1* 8/2002 Kasuya ............... G02B 15/173
396/53
2007/0296821 A1* 12/2007 Kakkori .................. G03B 7/00
348/208.6

FOREIGN PATENT DOCUMENTS

JP 2004-312138 A 11/2004
JP 2006-080837 A 3/2006

* cited by examiner

*Primary Examiner* — Usman A Khan
(74) *Attorney, Agent, or Firm* — Cowan, Liebowitz & Latman, P.C.

(57) ABSTRACT

An imaging apparatus includes a panning driver and a tilting driver for changing an imaging direction. A PT (pan-tilt) controller performs image blur correction by using at least one of a panning driver and a tilting driver, based on a shake detection signal of the imaging apparatus. The PT controller stores the position information of the current driver in a memory before each driver is driven in an image blur correcting start process. With the stored position as a reference position, image blur correction is performed by using the shake detection signal. After the end of the image blur correction control, the PT controller sets the position stored in the memory to the drive target value and controls the operation of each driver.

13 Claims, 7 Drawing Sheets

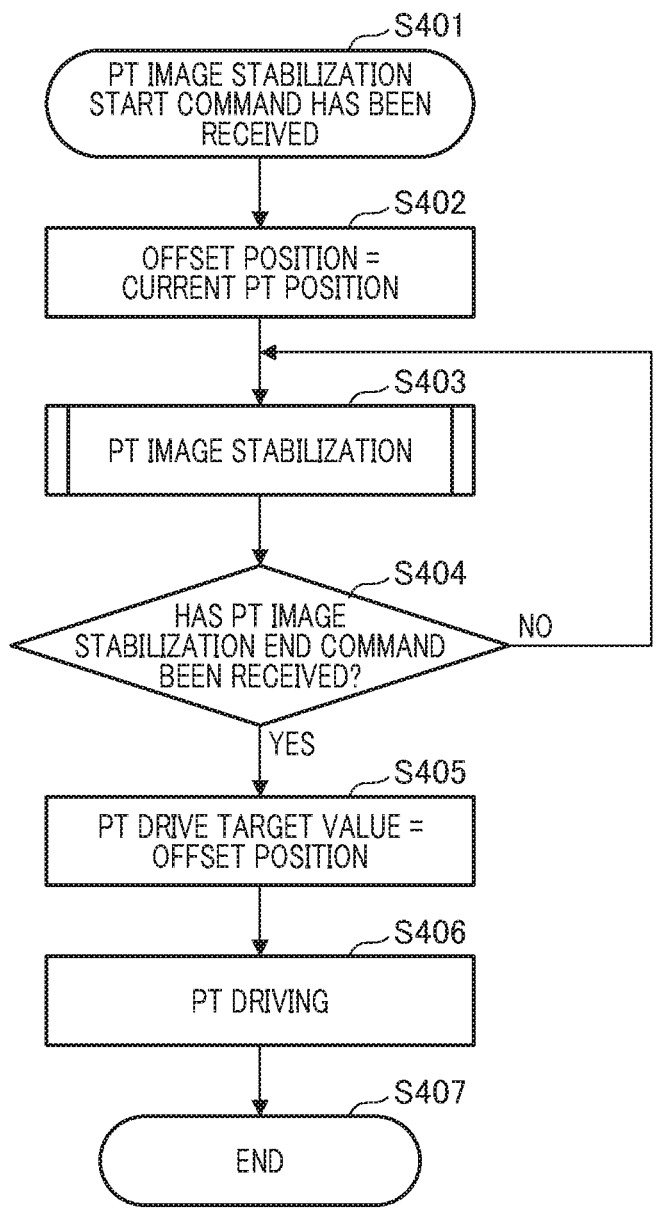

IMAGING APPARATUS CONFIGURED TO PERFORM IMAGE STABILIZATION AND CONTROL METHOD THEREOF

BACKGROUND OF THE INVENTION

Field of the Invention

The present invention relates to an imaging apparatus having a driver that changes an imaging direction, and a control method thereof.

Description of the Related Art

A pan-tilt (hereinafter, also referred to as "PT") device in a network camera controls and monitors an imaging direction and a field angle by remote control via a network or a dedicated line. In this type of the imaging apparatus, a panning (horizontal rotation) operation and a tilting (vertical rotation) operation are performed by a camera head. Additionally, in the imaging apparatus having an electric zoom function, a shooting angle can be changed by remote control.

In an imaging apparatus having an image stabilization function (image blur correcting function) for reducing a blur of a captured image caused by a vibration of an installation environment, electronic correction or optical correction is performed. In the electronic correction, image blur correction is performed by an image process, and in the optical correction, image blur correction is performed by driving, for example, a correction lens. Additionally, there is also a method that performs image blur correction by driving a lens barrel unit including a lens and an image sensor by using a pan-tilt mechanism (hereinafter, referred to as "PT image stabilization"). Compared to electronic correction and optical correction, the PT image stabilization enables correction to the shaking having large amplitude, so that it is effective in an installation environment where large shaking occurs, for example, on a ship.

Japanese Patent Application Laid-Open No. 2004-312138 discloses image stabilization control of a camera having a pan-tilt mechanism. The image stabilization function of the camera is temporarily deactivated in order to avoid shaking of a video image caused by the operation of the image stabilization function (electronic correction or optical correction) during start of PT driving and during stop of PT driving. Additionally, Japanese Patent Application Laid-Open No. 2006-80837 discloses a method that performs PT image stabilization with respect to a vibration with a predetermined frequency or less and amplitude with a predetermined value or more, based on the detected vibration.

However, the prior art disclosed in Japanese Patent Application Laid-Open No. 2004-312138 is to avoid an unnecessary image stabilization operation caused by a vibration generated due to the PT driving, and does not describe the following drawbacks relating to image blur correction control using the PT mechanism.

The prior art disclosed in Japanese Patent Application Laid-Open No. 2006-80837 does not describe which position should be used as a reference for an image stabilization process during the execution of PT image stabilization, in switching between the PT image stabilization function and another image stabilization function. Specifically, there has been a drawback which position should be used as a reference for the PT image stabilization process. Additionally, the prior art does not describe an end process of the PT image stabilization. For example, in the end process of the PT image stabilization, the PT driver ends the operation after receiving an end command. However, if the PT driving is ended immediately after receiving the end command of the PT image stabilization and the position of the pan-tilt mechanism unit is different between before and after the PT image stabilization, the imaging direction changes. Additionally, the prior art does not describe any PT driving method in a case in which a PT drive command other than the PT image stabilization is received during the execution of PT image stabilization. Therefore, even if the PT drive command is received during the execution of PT image stabilization, it is not possible to execute the PT image stabilization and PT driving together.

SUMMARY OF THE INVENTION

The present invention accurately performs image blur correction based on a shake detection signal in an imaging apparatus that performs image blur correction of a captured image by changing an imaging direction by using a driver.

An apparatus according to an embodiment of the present invention includes an imaging unit: a driver configured to change an imaging direction of the imaging unit: a memory configured to store position information of the driver; and a controller configured to perform image blur correction of an image by acquiring a detection signal from a detection unit that detects shaking and controlling the driver. When the controller starts the image blur correction, the controller performs the image blur correction by storing a position of the driver in the memory before driving the driver and using the detection signal with the position stored in the memory to serve as a reference position.

According to the present invention, in the imaging apparatus that performs image blur correction of a captured image by changing an imaging direction by using the driver, the image blur correction based on the shake detection signal can be accurately performed.

Further features of the present invention will become apparent from the following description of exemplary embodiments (with reference to the attached drawings).

BRIEF DESCRIPTION OF THE DRAWINGS

FIG. 4 is a flowchart illustrating a process during the receipt of a PT image stabilization start command in the first embodiment.

DESCRIPTION OF THE EMBODIMENTS

Hereinafter, embodiments of the present invention will be described in detail with reference to accompanying drawings. In each embodiment, an example of an imaging apparatus having a driving mechanism for panning and tilting will be described. The imaging apparatus has a preset registration function that registers a place where a user wants to shoot. During preset registration, a process is performed that stores, for example, position information of a panning driver or a tilting driver and zoom position information. Additionally, the imaging apparatus has a preset tour function and an automatic tracking function. The preset tour function is a function that automatically performs tour imaging based on a plurality of items of registered preset information. The automatic tracking function is a function that automatically tracks a detected object if a camera detects a moving object within a detection area. Hereinafter, a panning operation is abbreviated as a "P operation", and a tilting operation is abbreviated as a "T operation".

First Embodiment

Figure 1:
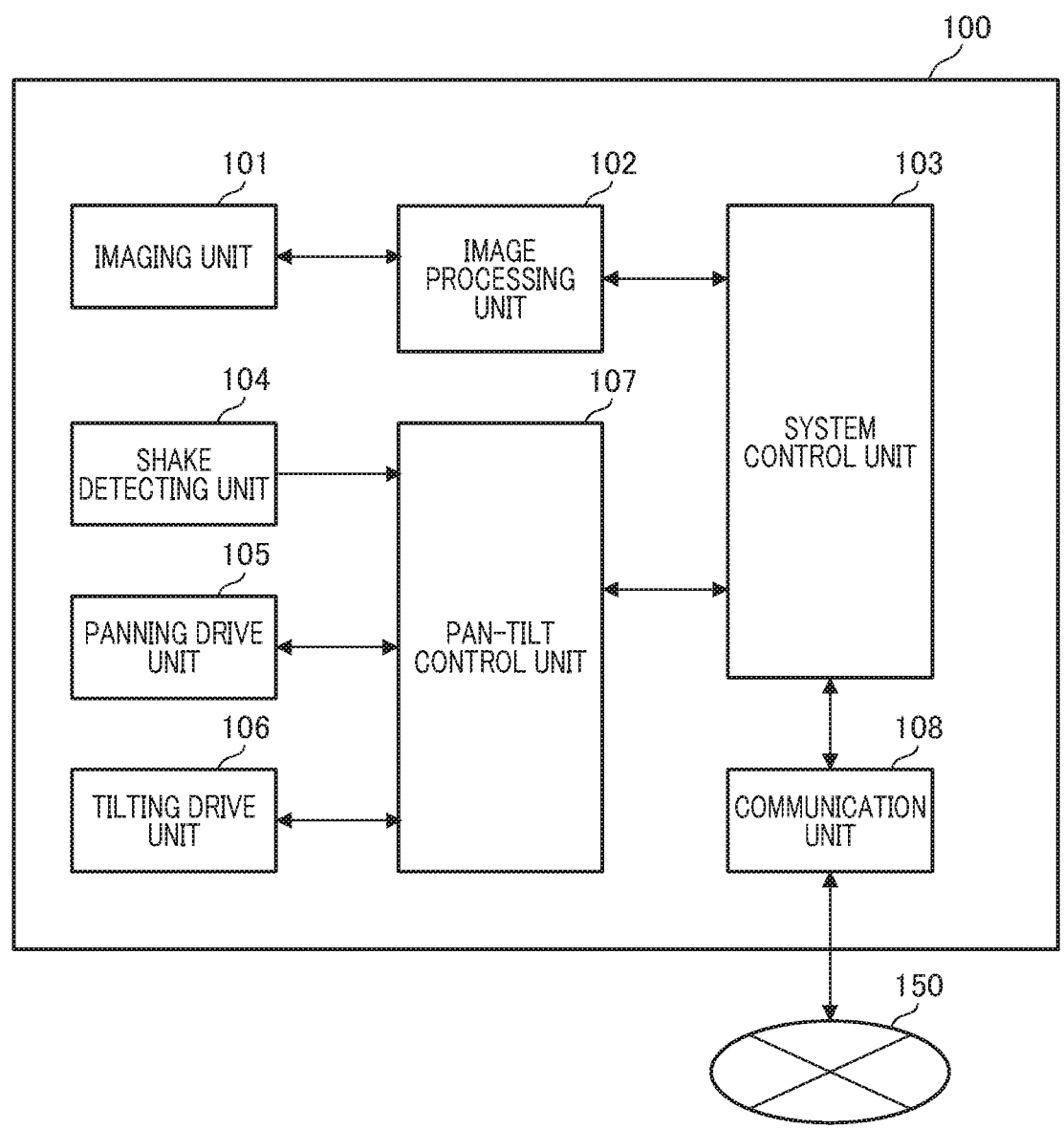
FIG. 1 is a functional block diagram of a network camera according to the first embodiment.

A first embodiment of the present invention will be described with reference to FIGS. 1 to 5. FIG. 1 is a functional block diagram of a network camera according to the present embodiment. A network camera 100 is connected to a client apparatus (information processing apparatus) via a network 150 in a mutually communicable state. The network camera 100 includes an imaging unit 101, an image processing unit 102, a system control unit 103, a shake detecting unit 104, a panning drive unit 105, a tilting drive unit 106, a pan-tilt control unit 107, and a communication unit 108.

The imaging unit 101 includes a lens that configures an imaging optical system, a lens driving mechanism, and an image sensor. The image sensor captures an image of an object and photoelectrically converts the object image, and outputs an electric signal. The image processing unit 102 performs development processing, image inversion processing, compressing, and coding processing, and the like on the image signal acquired by the imaging unit 101 to generate image data. The generated image data is output to the system control unit 103.

The system control unit 103 includes a CPU (central processing unit) and controls each component of the network camera 100. The system control unit 103 acquires the image data generated by the image processing unit 102 and performs a process that transmits the image data to a client device via the communication unit 108. Additionally, the system control unit 103 analyzes a camera control command from the client device acquired from the communication unit 108, and performs processing in accordance with the command. For example, the system control unit 103 instructs the image processing unit 102 to adjust the image quality, and also instructs the pan-tilt control unit (hereinafter, referred to as the "PT control unit") 107 to perform the P operation or the T operation, a preset tour, and automatic tracking.

The shake detecting unit 104 includes an angular velocity sensor such as a gyro sensor and various analog filters for noise cancellation. The shake detecting unit 104 detects, for example, angular velocities in the panning direction and the tilting direction of the network camera 100 and outputs detection signals to the PT control unit 107. In an angular velocity sensor such as a gyro sensor, one detection sensor for panning direction and one detection sensor for tilting direction are disposed, or one biaxial sensor that can perform simultaneous detection in the two directions is disposed. The detected angular velocity information is output to the PT control unit 107 and used for image blur correction control to be described below.

The panning drive unit 105 is configured by a mechanism unit that performs the P operation of the imaging unit 101, a motor that is a driving source thereof, and an angle sensor that detects a driving angle of the P operation. The tilting drive unit 106 is configured by a mechanism unit that performs the T operation of the imaging unit 101, a motor that is a driving source thereof, and an angle sensor that detects a driving angle of the T operation.

The PT control unit 107 controls the P operation and the T operation in accordance with an instruction from the system control unit 103. Additionally, the PT control unit 107 converts the angular velocity information acquired from the shake detecting unit 104 into angle information, and controls the panning drive unit 105 and the tilting drive unit 106 based on the detected information. Additionally, the PT control unit 107 performs a process that stores information necessary for control (for example, angular velocity information and angle information of shaking, panning angle and tilting angle) in a memory (not illustrated).

The communication unit 108 performs a process that receives the camera control command transmitted from the client device and transmits the command to the system control unit 103. Additionally, the communication unit 108 transmits a response signal for the camera control command to a client apparatus. Note that the present invention is not limited to the configuration shown in FIG. 1, and, for example, the network camera 100 may have a sound input/output unit and an external device input/output unit. The form of the communication connection of the communication unit 108 may be a wired communication connection or a wireless communication connection.

Figure 2A:
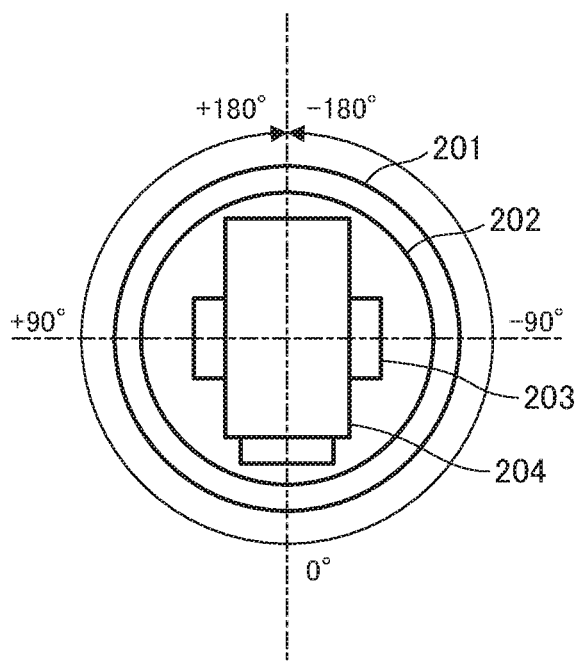
FIGS. 2A and 2B are configuration diagrams of the network camera according to the first embodiment.
Figure 2B:
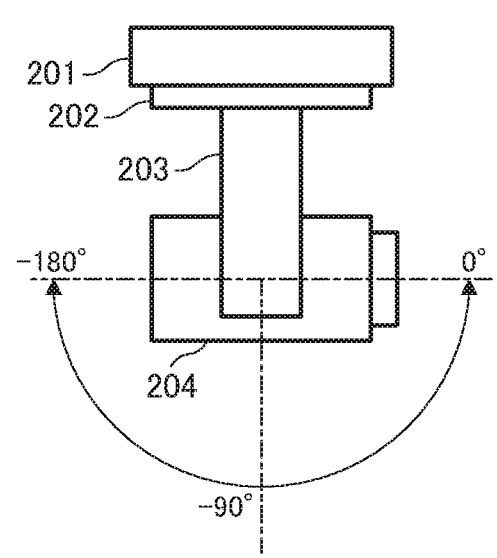

Subsequently, the mechanical configuration of the network camera 100 will be described with reference to FIGS. 2A and 2B. FIG. 2A illustrates the network camera 100 attached to the ceiling as viewed from the bottom side. FIG. 2B is a side view of the network camera 100. In FIG. 2B, the bottom case 201 and the turn table 202 are arranged on the upper side, and the camera head 204 is attached to a camera head column 203. In FIG. 2B, the P operation and the T operation are described, in which the axis in the vertical direction is defined as the vertical axis and the axis orthogonal to this axis is defined as the horizontal axis. Note that, in FIG. 2A, the clockwise direction around the vertical axis that is orthogonal to the plane of the drawing is defined as the positive direction of the panning angle, and in FIG. 2B, the counterclockwise direction around the axis that is orthogonal to the plane of the drawing is the positive direction of the tilting angle direction.

The panning drive unit shown in FIGS. 2A and 2B is configured by a bottom case 201 and a turn table 202. The turn table 202 rotates in the horizontal direction around the vertical axis. Electric circuits respectively arranged on the fixed part of the bottom case 201 and the rotating part of the turntable 202 are connected by, for example, a slip ring, so that a panning movable part can rotate endlessly within the angle range of 360° in the plane including the horizontal axis. Additionally, an encoder is attached to the turntable 202, and a circular encoder scale for measuring a moving amount of the encoder is attached to the bottom case 201 so that a rotation angle (panning angle) of the panning movable portion is detected.

The tilting drive unit is configured by the camera head support 203 and a camera head 204 provided on the turntable 202. The camera head 204 rotates in the vertical direction around the horizontal axis. The tilting movable part can rotate from 0° in the horizontal direction to −90°, further down to −180° straightly in a downward direction. Since the encoder is attached to the camera head 204 and the circular encoder scale for measuring a moving amount of the encoder is attached to the camera head support column 203, the rotation angle (tilting angle) of the tilting movable portion is detected by using them.

The network camera 100 according to the present embodiment can shoot a wide range by changing an imaging direction by rotating the camera head 204 in the horizontal direction and the vertical direction. Note that, not being limited to the configurations shown in FIGS. 2A and 2B, for example, a drivable range in the panning direction may be limited to a predetermined angle range (for example, +170° to −170°). In a similar manner, a drivable range in the tilting direction may be limited to a predetermined range (for example, 0° to −90°).

Figure 3A:
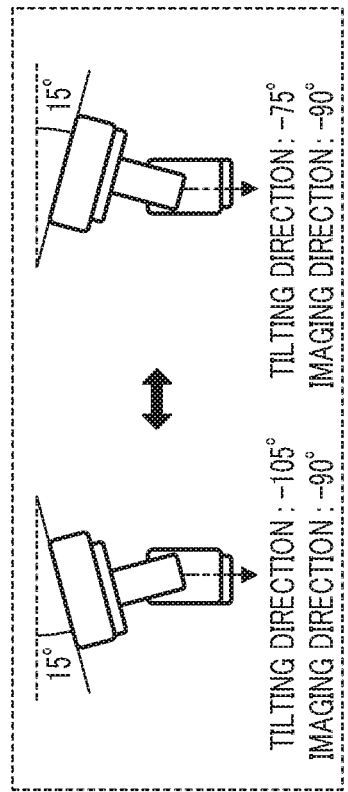
FIGS. 3A and 3B are schematic diagrams of image blur correction control according to the first embodiment.
Figure 3B:
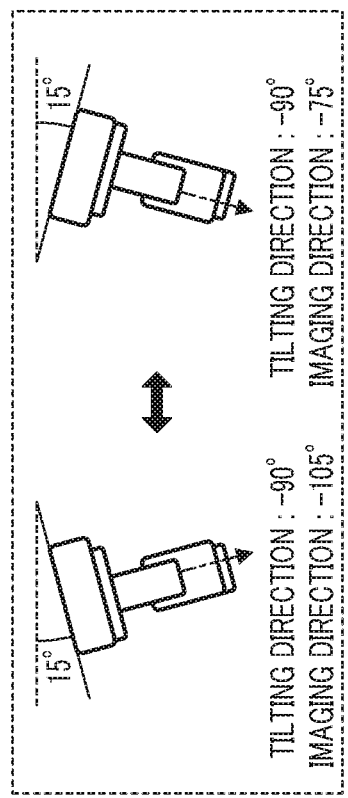

The PT image stabilization control of the network camera 100 will be described with reference to FIGS. 3A and 3B. FIGS. 3A and 3B are schematic diagrams illustrating a manner in which the image stabilization control is performed by using the tilting drive unit 106. FIG. 3A illustrates an OFF state of PT image stabilization control and FIG. 3B illustrates an ON state of the PT image stabilization control. In the present embodiment, although the image stabilization control in the tilting direction is performed, the image stabilization control in the panning direction may be performed by using the panning drive unit 105. Alternatively, the image stabilization control by using the tilting drive unit 106 and the panning drive unit 105 together may be performed.

The network camera 100 shown in FIGS. 3A and 3B is attached to the ceiling, in which the ceiling is shaking at the angle of about ±15° in the tilting direction. For example, a case is assumed in which the network camera 100 is attached to the ceiling of a cabin. As the ship is significantly shaken due to waves, the ceiling of the cabin also is significantly shaken. The camera head 204 is in a position where the imaging direction is at −90° directly below for shooting the inside of the cabin. In the OFF state in FIG. 3A, the camera head 204 tils due to the shaking of the ceiling, and it is impossible to perform shooting in a desired imaging direction, in other words, shooting at the angle of −90°. If the imaging direction changes within the range of ±15°, a blur of video image corresponding to the angle of −75° to −105° occurs, so that the image is very difficult to view.

In contrast, if the PT image stabilization control is set to ON, the PT control unit 107 controls the tilting drive unit 106 in accordance with the shake detection signal detected by the shake detecting unit 104, and controls the driving with respect to the camera head 204 within the range from −75° to −105°. As shown in FIG. 3B, in accordance with the shaking, shooting in the direction of −90° directly below can be always performed. As described above, if the PT image stabilization is set to the ON state, it is possible to provide a user with unblurred images even though the ship is significantly shaken.

the PT image stabilization process according to the present embodiment will be described. FIG. 4 is a flowchart illustrating a process if the PT control unit 107 receives a start command of the PT image stabilization control from the system control unit 103. In step S401, the process during the receipt of the start command starts. In step S402, the PT control unit 107 performs a process that stores current position information in the memory to serve as the offset position (reference position, amplitude center position) during the PT image stabilization. The current position is a position of the panning drive unit 105 and a position of the tilting drive unit 106 before starting the PT image stabilization control. Specifically, since the PT image stabilization control has not started yet at this time point, the stored value is a panning angle and a tilting angle in a state in which the panning drive unit 105 and the tilting drive unit 106 are stationary.

In step S403, the PT image stabilization process is executed. This process is periodically performed until the time point when the PT control unit 107 has determined that the end command of the PT image stabilization control in step S404 has been received. The details of the image stabilization process by the PT image stabilization will be described below with reference to the flowchart in FIG. 5.

In step S404, the PT control unit 107 determines whether or not the end command of the PT image stabilization control has been received from the system control unit 103. If the PT control unit 107 has determined that the end command has been received, the process proceeds to step S405. If the PT control unit 107 has determined that the end command has not been received, the process returns to step S403 and the PT image stabilization process continues. In step S405, the PT control unit 107 sets the offset position stored in the memory in step S402 as the PT drive target value, in other words, the target value for driving the panning drive unit 105 and the tilting drive unit 106. The correction value calculated based on the detection signal of the shake detecting unit 104 is not used. Next, in step S406, the panning drive unit 105 and the tilting drive unit 106 are driven in accordance with the drive target value set by the PT control unit 107 in step S405. Subsequently, in step S407, the process sequence during the receipt of the start command of the PT image stabilization control ends.

Figure 5:
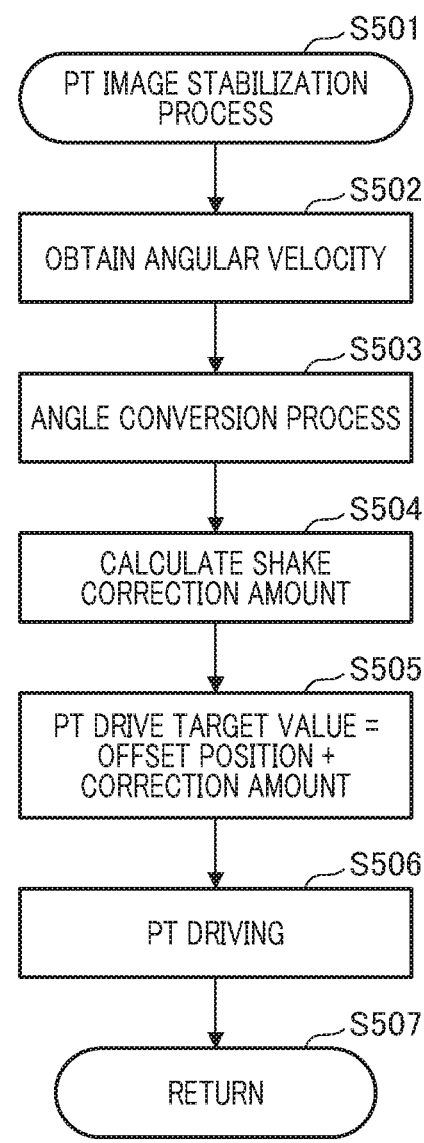
FIG. 5 is a flowchart of a PT image stabilization process in the first embodiment.

FIG. 5 is a flowchart that illustrates the PT image stabilization process shown in step S403 in FIG. 4. In step S501, the PT image stabilization process starts. In step S502, the PT control unit 107 acquires detection signals of the angular velocity in the panning direction and the angular velocity in the tilting direction from the shake detecting unit 104. In step S503, the PT control unit 107 integrates the value acquired in step S502 to calculate the angle in the panning direction and the angle in the tilting direction. Various filters (for example, high-pass filter, low-pass filter, phase lead filter) are used during calculation.

In step S504, the PT control unit 107 calculates a shake correction amount that performs correction by PT driving based on the angle value in the panning direction and the tilting direction calculated in step S503. The shake correction amount is a correction amount for canceling an angle generated due to shaking. For example, if the tilting angle is 10° as the angle value calculated in step S503, the shake correction amount is −10°.

In step S505, the PT control unit 107 calculates each drive target value of the panning drive unit 105 and the tilting drive unit 106. The drive target value is a value acquired by adding the shake correction amount calculated in step S504 with the PT position (offset position) before starting the PT image stabilization control stored in the memory in step S402 in FIG. 4 as a reference position. For example, if the offset position of the tilting angle is 90°, the shake correction amount calculated in step S504, that is, −10° is added, and as a result, 80° is calculated as a drive target value in the tilting direction. The addition in this case also includes addition of negative values, in other words, subtraction.

In step S506, the PT control unit 107 outputs control commands that respectively correspond to each drive target value in the panning direction and the tilting direction calculated in step S505 to the panning drive unit 105 and the tilting drive unit 106. Accordingly, the P operation and the T operation are performed in accordance with the drive target value in which the shake correction has been performed. In step S507, the process proceeds to the return process and a subroutine of the image blur correction process by the PT image stabilization ends.

In the PT image stabilization control, the image blur correction process is performed by the drive control of the panning drive unit or the tilting drive unit so as to cancel shaking in accordance with the amount of shaking detected in the panning direction or the tilting direction. Accordingly, it is possible to correct image blur caused by the shaking of the imaging apparatus.

In the present embodiment, the current positions of the panning drive unit and the tilting drive unit are stored before starting PT image stabilization, and during the execution of the PT image stabilization, the stored position is used as the offset position (reference position) of the PT image stabilization process. Upon end of the PT image stabilization, the PT image stabilization process ends after driving the panning drive unit and the tilting drive unit to the stored position. Accordingly, wherever the panning drive position and the tilting drive position are located before starting the PT image stabilization, the image blur correction process can be accurately performed with the position before starting the PT image stabilization as a reference position. Additionally, end the PT image stabilization ends, the process ends after moving the panning drive unit and the tilting drive unit to the offset position stored before starting the PT image stabilization instead of stopping the PT driving immediately receiving the PT image stabilization end command. Therefore, it is possible to set the positions of the panning drive unit and the tilting drive unit to the same position before and after the start of the PT image stabilization control, thereby avoiding a deviation in the imaging direction.

Modification of First Embodiment

In the first embodiment, although a description will be given of an open loop control method that does not use feedback in the PT image stabilization process, the present invention is not limited thereto. In the modified example, after the PT drive target value is calculated in step S505 in FIG. 5, the current positions of the panning drive unit and the tilting drive unit are acquired, the difference between the current position and the PT drive target value is calculated, and feedback control is performed. Therefore, the PT image stabilization control having a higher reliability can be performed.

Additionally, in the modified example, a speed for returning the PT drive position to the offset position after receiving the PT image stabilization end command is changed in accordance with the amplitude and frequency of the detection signal of the shake detecting unit 104. For example, if the shake frequency is low, the PT drive position is slowly returned to the offset position, and if the shake frequency is high, the PT drive position is quickly returned to the offset position. As a result, it is possible to reduce an unnatural feeling of the video image caused by switching between the state in which PT image stabilization is executed and the state in which PT image stabilization is not executed.

In the first embodiment, after receiving the PT image stabilization end command, the PT drive target value is set as the offset position, and immediately after that, the driving to the offset position is performed and the process ends. The present invention is not limited to this, and the driving to the offset position may be performed by taking a predetermined time. In the modified example, after receiving the PT stabilization end command, in accordance with the output of the shake detecting unit 104, the drive unit is decelerated by multiplying the target value by a gain so as to gradually decrease this, and after the elapse of a predetermined time, control that stops the driving at the offset position is performed. Accordingly, it is possible to further reduce an unnatural feeling caused by switching between the state in which the PT stabilization is executed and the state in which the PT stabilization is not executed. Additionally, in an imaging apparatus having an optical or electronic image stabilization (image blur correction) function other than PT image stabilization function, it is effective in switching between the PT image stabilization and another image stabilization unit. The above matters can be similarly applied to embodiments to be described below.

Second Embodiment

A second embodiment of the present invention will be described with reference to FIGS. 6 and 7. A description will be given by focusing on differences from the first embodiment by using reference numerals that have already been used for the components that are the same as those in the first embodiment of the present embodiment and omitting their detailed description.

In the present embodiment, a description will be given of the PT driving in a case in which the network camera 100 receives a PT drive command other than the PT image stabilization during the execution of the PT image stabilization. The PT drive command other than PT image stabilization is a command related to, for example, a manual PT drive operation by a user, preset tour, automatic tracking.

Figure 6:
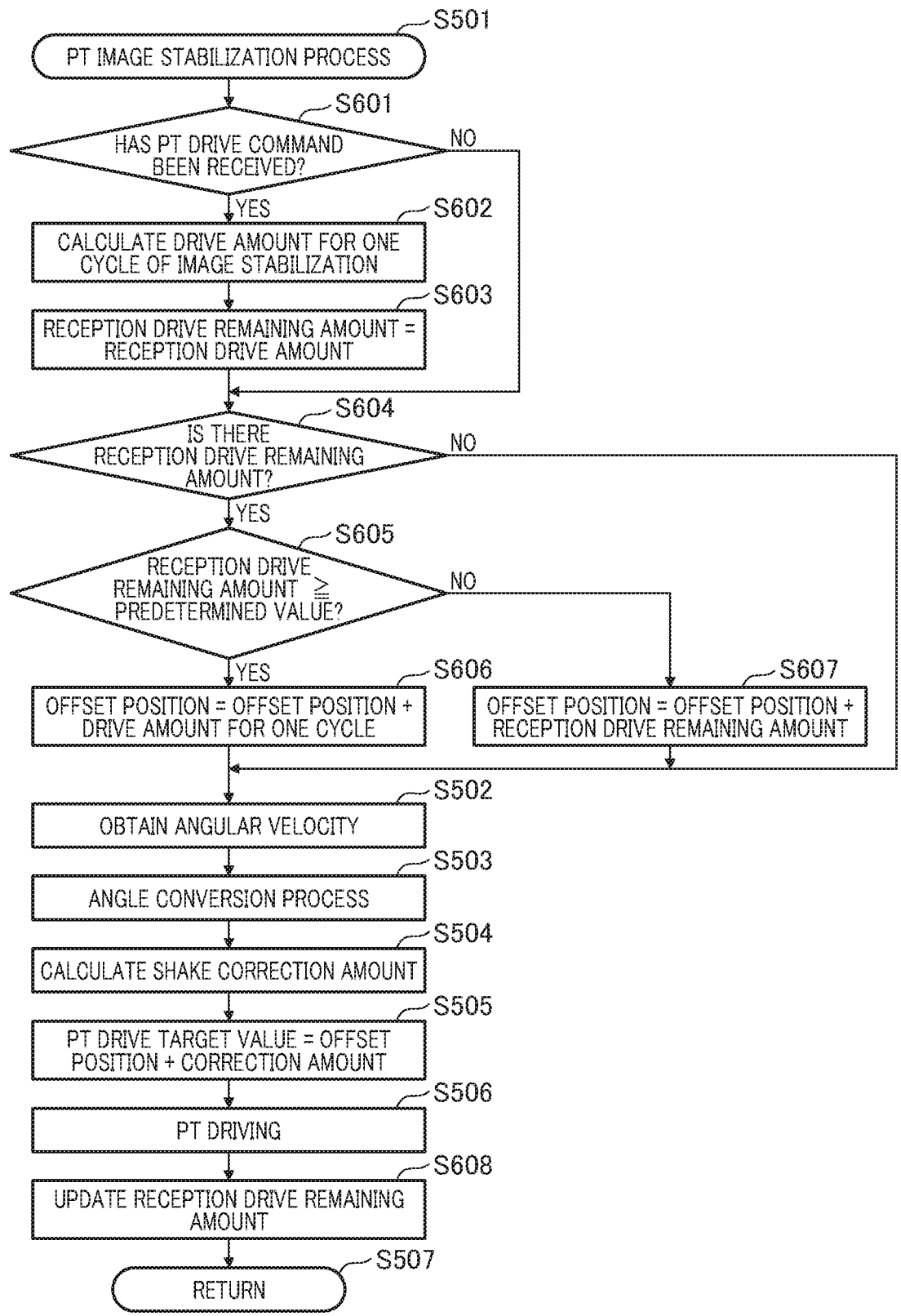
FIG. 6 is a flowchart of the PT image stabilization process according to the second embodiment.
Figure 7:
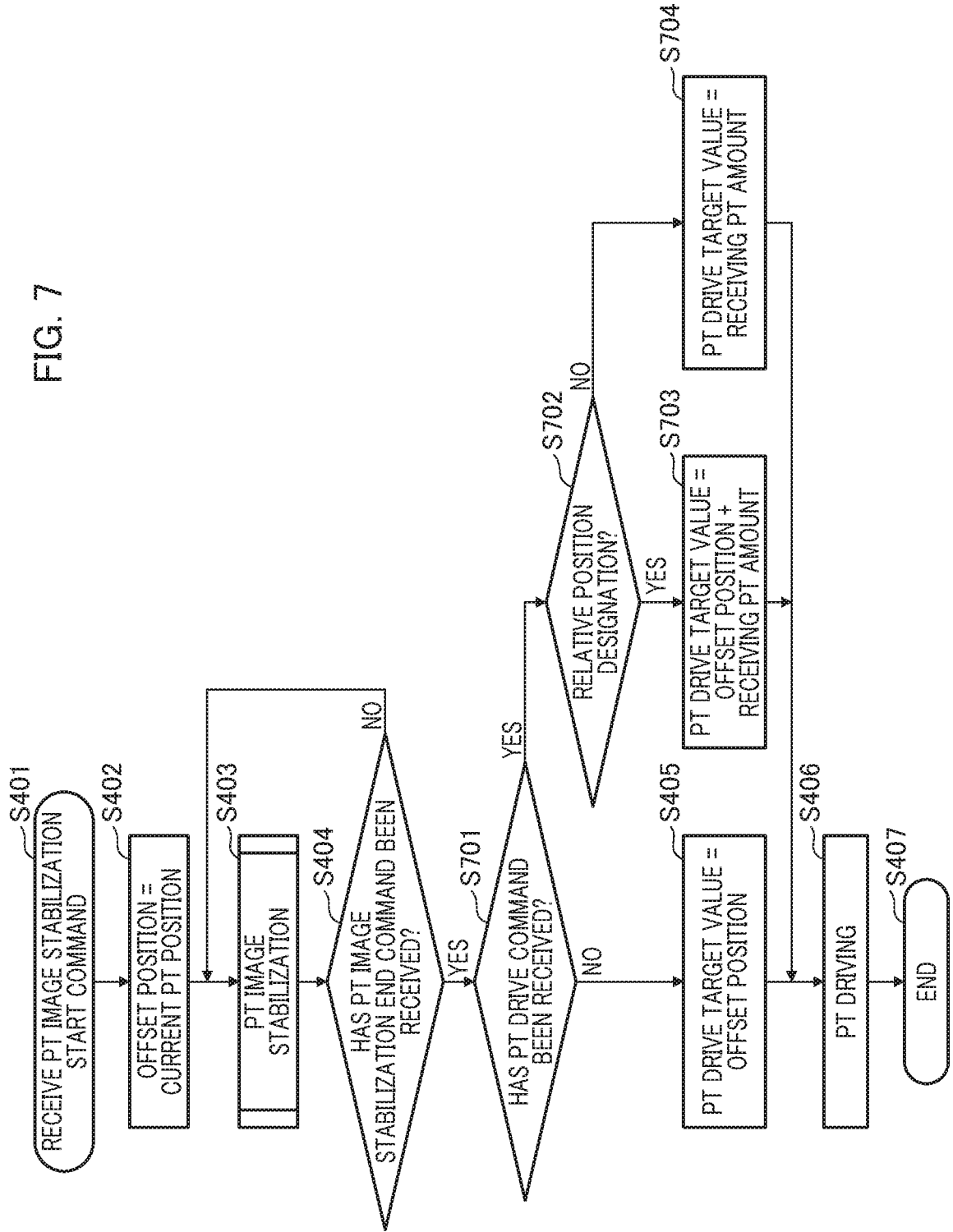
FIG. 7 is a flowchart illustrating a process during the receipt of the PT image stabilization start command in the second embodiment.

With reference to FIG. 6, the sequence of the PT image stabilization process according to the present embodiment will be described. A detailed description of FIG. 6 will be omitted by describing the difference with FIG. 5 and using the same step numbers for the same process as in FIG. 5.

Following step S501, in step S601, the PT control unit 107 determines whether or not a PT drive command other than the PT image stabilization has been received from the system control unit 103. When the PT control unit 107 determines that a PT drive command other than the PT image stabilization has been received, the process proceeds to step S602. When the PT control unit 107 determines that the PT drive command other than PT image stabilization has not been received, the process proceeds to step S604.

In step S602, the PT control unit 107 calculates a driving amount in one cycle of the PT stabilization control based on the driving amount indicated by the received PT drive command and the driving speed. The driving amount in one cycle of the PT image stabilization control is a driving amount other than the PT image stabilization in performing the PT image stabilization process once in step S501. The PT image stabilization process is periodically performed until the PT control unit 107 receives the end command of PT image stabilization in step S404 in FIG. 4. The cycle is set to, for example, a cycle corresponding to 2 kHz (500 microseconds). If the driving speed has not been received in step S601, the driving speed instructed before the last time is used. The driving amount in one cycle of the PT image stabilization control is denoted by "p", the received PT driving speed is denoted by "v", and the frequency related to the execution of PT image stabilization control is denoted by "f". The driving amount "p" in one cycle of the PT image stabilization control is calculated from the following formula (1).

[Formula 1]

$$p = \frac{v}{f} \quad (1)$$

For example, in step S601, if the PT control unit 107 has received the tilting drive command, the received driving speed is set to v=450 [°/s] and the frequency of the PT image stabilization control is set to f=2000 [Hz]. In this case, the drive amount in one cycle, p=450/2000=0.225°, is obtained. Therefore, in one cycle corresponding to 2,000 Hz, if the tilting drive unit 106 is controlled in one image stabilization process by 0.225° each cycle, the driving of the T operation is performed at the speed of 450°/s.

In step S603, the PT control unit 107 sets the reception drive amount as a reception drive remaining amount. For example, if 60° is received to serve as the drive amount in the tilting direction in step S601, the current reception driving remaining amount is 60°. The drive amount and the reception drive remaining amount here are relative amounts from the current position. If the drive amount has been received by designating the absolute position in step S601, the difference between the position indicated by the drive amount and the current position is calculated and stored in the memory as a relative drive amount. Additionally, the reception drive remaining amount is a drive remaining amount related to the PT drive command other than the PT image stabilization, and is not a drive remaining amount (a value calculated from the shake detecting unit 104) during the PT image stabilization control.

In step S604, the PT control unit 107 determines whether or not there is a reception drive remaining amount for the received PT drive amount. Specifically, it is determined whether or not "reception drive remaining amount >0" is established by comparing the reception drive remaining amount with zero. Note that the process in step S604 is also performed in a case in which it is determined that the PT drive command has not been received in step S601. The reason is that PT driving is needed if the reception drive remaining amount is not zero in the second or later image stabilization process in step S501 after receiving the PT drive command. If it is determined that the reception drive remaining amount is larger than zero, the process proceeds to step S605, and if it is determined that there is no reception drive remaining amount (reception drive remaining amount=0), the process proceeds to step S502.

In step S605, the PT control unit 107 determines whether or not the reception drive remaining amount is equal to or larger than a predetermined value. The predetermined value is a threshold value set by taking into consideration of the minimum drivable angle of each of the panning drive unit 105 and the tilting drive unit 106. Although the minimum drivable angle of the panning drive unit 105 and the tilting drive unit 106 is determined by the characteristics of the motor and the structure of the mechanism, it cannot be driven at an angle smaller than the minimum drivable angle. Hence, the predetermined value is determined in advance so that the drive amount per one time does not become less than the minimum drivable angle. Additionally, the predetermined value may be determined by taking into consideration of the driving amount in one cycle of the PT stabilization control acquired in step S602. In the present embodiment, for example, the predetermined value is set to 0.2° (threshold value). If it is determined that the reception drive remaining amount is equal to or larger than the threshold value, the process proceeds to step S606, and if it is determined that the reception drive remaining amount is less than the threshold value, the process proceeds to step S607.

In step S606, the PT control unit 107 adds the drive amount for one cycle calculated in step S602 to the offset position (the position stored in step S402 in FIG. 4 the first time). For example, assuming that the offset position is 90°, 90.225° is obtained by adding 0.225°, which is the drive amount for one cycle, to 90°, this value is overwritten to the offset position stored in the memory.

In step S607, the PT control unit 107 adds the total amount of the reception drive remaining amount to the offset position. For example, if the driving amount received in step S601 is 60°, the PT image stabilization process is executed 266 times, and as a result, the driving is performed at the angle of 0.225°×266 times=59.85°, which is the driving amount for one cycle. At the 267th time, the reception drive remaining amount in executing the image stabilization process in step S501 is 60°−59.85°=0.15°. Since this is less than 0.2°, which is a threshold value, the PT control unit 107 adds 0.15°, which is the total amount of the reception receiving remaining amount, to the offset position. For example, if the offset position is 149.85°, a process is performed that adds 0.15° to the offset position and updates 150° as a new offset position. If the offset position is 90° before receiving the PT drive command, 0.225° is added to the offset position while executing the image stabilization processes 267 times after receiving the PT drive command of 60°, eventually enabling driving the movable part to 150°.

After the processes in steps S606 and S607, the processes from steps S502 to S506 are executed. In the following step S608, since the PT driving has been performed in step S506, which is a step immediately before step S608, the PT control unit 107 updates the reception drive remaining amount. Specifically, if the process of step S606 has been executed, the P operation or the T operation has already been driven by the drive amount obtained by adding the drive amount for one cycle to the offset position. Accordingly, the PT control unit 107 updates a value obtained by subtracting the drive amount for one cycle from the current reception drive remaining amount as a new drive remaining amount. In contrast, if the process of step S607 has been executed, the P operation or the T operation has already been driven by the drive amount obtained by adding the total drive remaining amount to the offset position. Therefore, the PT control unit 107 updates the driving remaining amount as zero. Subsequently, the process proceeds to step S507.

Next, with reference to the flowchart in FIG. 7, a description will be given of a process when the PT control unit 107 receives a PT drive command other than the PT image stabilization after receiving the PT image stabilization end command. Note that a difference between FIG. 4 and FIG. 7 is described and the same reference numerals are provided for processes that are the same as those in FIG. 4, and the detailed description thereof will be omitted.

The process proceeds to step S701 after it is determined in step S404 that the end command of the PT image stabilization control has been received, and the PT control unit 107 determines whether or not a PT drive command other than the PT image stabilization has been received. If it is determined that a PT drive command other than the PT image stabilization has been received, the process proceeds to S702, and if it is determined that the PT drive command has not been received, the process proceeds to step S405.

In step S702, the PT control unit 107 determines whether or not the PT drive command received in step S701 is a command that has been received by the relative position designation or a command that has been received by the absolute position designation. The relative position designation is to designate a moving amount from the current position to the moving destination with a relative angle. Additionally, the absolute position designation is to designate the position of the moving destination as the absolute angle. If it is determined that the PT drive command is a command received by the relative position designation, the process proceeds to step S703, and if it is determined that it is a command received by the absolute position designation, the process proceeds to step S704.

In step S703, the PT control unit 107 sets a value obtained by adding the PT drive amount received in step S701 to the offset position to serve as the PT drive target value. In contrast, in step S704, the PT control unit 107 sets the PT drive amount received in step S701 as the PT drive target value as it is. After the processes of steps S703 and S704, the process proceeds to step S406.

In the present embodiment, if a PT drive command other than the PT image stabilization has not been received in step S701, the offset position is set as the PT drive target value, the driving of the P operation and the T operation is performed, and the process ends. In contrast, if a PT drive command other than the PT image stabilization has been received in step S701, the target position is not necessarily returned to the offset position, and, instead, driving by the P operation and the T operation is performed in accordance with the received drive amount, and the process ends. Therefore, quick driving to the target drive position is enabled.

In the present embodiment, in the process in which a PT drive command other than the PT image stabilization has been received during the PT image stabilization, the PT drive amount related to the drive command other than the received PT image stabilization is added to the offset position (amplitude center position) of the PT image stabilization process. Accordingly, even during the execution of the PT image stabilization, it is possible to execute a PT drive command other than PT image stabilization, thereby further improving convenience. Additionally, in the present embodiment, if a PT drive command other than the PT image stabilization has been received during the end of the PT image stabilization, the driving ends after performing drive control so as to return to the position corresponding to the received PT drive amount, instead of ending the driving after moving to the offset position. By setting the drive target value in accordance with the drive amount by a drive command other than the PT image stabilization, driving to the designated PT position can be performed earlier.

Modification of Second Embodiment

In the second embodiment, although an example of performing the determination process whether or not the reception drive remaining amount is equal to or larger than the predetermined value is described in step S605 in FIG. 6, the present invention is not limited thereto. In the modification, a determination process that determines whether or not the drive amount for one cycle calculated in step S602 is equal to or more than a predetermined threshold value is also performed. For example, if the drive amount for one cycle is less than a threshold value, the drive amount for one cycle is not added to the offset position for each process. Instead, once for each predetermined number of processes, a set value in which a value obtained by multiplying the drive amount for one cycle by the predetermined number that is equal to or more than the threshold value is added to the offset position.

In the modified example, a speed for the driving to the PT drive target value after receiving the PT image stabilization end command is changed in accordance with the amplitude and frequency of the shaking detected by the shake detecting unit 104. For example, if the shake frequency is low, the driving to the PT drive target value is slowly performed at a low speed, and if the shake frequency is high, the driving to the PT drive target value is performed quickly. As a result, it is possible to reduce an unnatural feeling in the video image caused by the switching between the state in which PT image stabilization is executed and the state in which PT image stabilization is not executed.

In the second embodiment, an example has been described in which driving to the PT drive target value is performed immediately after receiving the PT image stabilization end command and the process ends. The present invention is not limited to this, and drive control to the PT drive target value may be performed by taking a predetermined time. For example, after receiving the PT image stabilization end command, a gain in accordance with the output of the shake detecting unit 104 is calculated, a gain multiplication process is performed so as to stepwise decrease the drive output, and after a predetermined time, the driving to the PT drive target value is stopped. Accordingly, it is possible to further reduce the an unnatural feeling of the video image caused by the state in which PT image stabilization is executed and the state in which PT image stabilization is not executed. Additionally, in the imaging apparatus having an image stabilization unit (for example, optical or electronic image stabilization unit) other than PT image stabilization, it is effective during, for example, switching the image stabilization units.

According to the above embodiment, in the imaging apparatus that corrects an image blur caused by the shaking of the imaging unit by using the drive unit, the position information of the drive unit is stored before the start of the process of image blur correction control by PT image stabilization and is used as a reference position. It is possible to appropriately execute the image blur correction control based on a shake detection signal with the position of the driver stored before executing the image blur correction as the reference position so that a deviation in the imaging direction can be suppressed before the control start and the control end. Additionally, if a PT drive other than the PT image stabilization command is received during the execution of the image blur correction, the drive control in accordance with the PT drive command can be performed.

Other Embodiments

Although the preferred embodiments of the present invention have been described above, the present invention is not limited to these embodiments, and various modifications and changes are possible within the scope of the gist thereof. In the above embodiment, an example has been described in which position information of each of the panning drive unit and the position information of the tilting drive unit as an offset position are stored in the memory, the present invention is not limited to thereto. For example, a case is assumed in which the image stabilization control using the panning drive unit is disabled for the shaking in the horizontal direction and the image stabilization control using the tilting drive unit for the shaking in the vertical direction is enabled. In this case, it is sufficient to store only the position of the tilting drive unit in the memory before starting PT image stabilization. In contrast, if the image stabilization control using only the panning drive unit is enabled, it is sufficient to store only the position of the panning drive unit in the memory before starting PT image stabilization.

In the above embodiments, a configuration example including only the PT image stabilization control unit using the pan-tilt mechanism has been described. As another control unit, for example, a configuration including a control unit that performs optical or electronic image blur correction or a control unit that performs optical and electronic image blur correction may be used. In the imaging apparatus having a plurality of control units, it is possible to select a method that uses the PT image stabilization control unit and another control unit in combination, or a method that individually uses the control units by switching each other, thereby further improving the image blur correction performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-222883, filed Nov. 20, 2017 which is hereby incorporated by reference wherein in its entirety.

What is claimed is:

1. An imaging apparatus comprising:
an imaging unit configured to include an imaging optical system and an image sensor;
a drive unit configured to include at least one motor and perform at least one of a panning operation and a tilting operation for an imaging optical system and an image sensor; and
a processor configured to perform image blur correction of an image acquired by using the imaging optical system and the image sensor, by acquiring a detection signal from a detector that detects a shake and controlling at least one of the panning operation and the tilting operation,
wherein, when the processor starts the image blur correction, the processor performs the image blur correction by storing a position information related to the imaging optical system and the image sensor before performing at least one of the panning operation and the tilting operation, and using the detection signal with the position information to serve as a reference position, and
wherein, when the processor receives a drive command that is different from the command for the image blur correction during the execution of the image blur correction, the processor adds the correction amount calculated based on the detection signal to the position information, and a value obtained by adding a drive amount in one cycle of the image blur correction process, which has been calculated based on a drive speed of the drive unit by the drive command and a cycle for performing the image blur correction process, is set as the drive target value of the drive unit.

2. The imaging apparatus according to claim 1, wherein the drive unit includes a first drive unit configured to rotate an imaging direction of the imaging optical system in a horizontal direction by using a first motor, and
wherein the processor stores the position information in the horizontal direction before the processor starts the image blur correction.

3. The imaging apparatus according to claim 2, wherein the drive unit includes a second drive unit configured to rotate the imaging direction of the imaging optical system in a vertical direction by using a second motor, and
wherein the processor stores the position information in the vertical direction before the processor starts the image blur correction.

4. The imaging apparatus according to claim 1, wherein, in a process of the image blur correction, the processor calculates a drive target value of the drive unit by adding a correction amount calculated based on the detection signal to the reference position.

5. The imaging apparatus according to claim 1, wherein, when the processor ends the image blur correction, the processor sets a value of the position information as the drive target value of the drive unit.

6. The imaging apparatus according to claim 1, wherein, when a drive remaining amount is equal to or more than a threshold value as a result of calculating the drive remaining amount of the drive unit during the execution of the image blur correction, the processor adds the drive amount in one cycle of the image blur correction process to the position information, and when the drive remaining amount is less than the threshold value, the processor adds the drive remaining amount to the position information, further adds the correction amount, and sets the drive target value of the drive unit, thereby updating the drive remaining amount.

7. The imaging apparatus according to claim 1, wherein when the processor has received the drive command and ends the image blur correction, the processor sets the drive target value of the drive unit in accordance with the drive amount by the drive command.

8. The imaging apparatus according to claim 1, wherein when the processor ends the image blur correction, the processor performs control to change a drive speed of the drive unit to a drive speed based on the detection signal.

9. The imaging apparatus according to claim 1, wherein, when the processor ends the image blur correction, the controller performs control to decelerate the drive unit by multiplying the output to the drive unit by a gain to stop the drive unit at the drive target value.

10. The imaging apparatus according to claim 1, wherein the drive command is a command related to driving operation of the drive unit.

11. The imaging apparatus according to claim 1, wherein the drive command is a command related to preset tour of the drive unit.

12. The imaging apparatus according to claim 1, wherein the drive command is a command related to automatic tracking by the drive unit.

13. A control method executed in an imaging apparatus that enables image blur correction of an image obtained by using an imaging optical system and an image sensor, the method comprising:
storing position information of a drive unit that include at least one motor and perform at least one of a panning operation and a tilting operation for the imaging optical system and the image sensor; and
performing image blur correction of an image obtained by using the imaging optical system and the image sensor, by acquiring a detection signal from a detector that detects shaking and controlling at least one of the panning operation and the tilting operation, and wherein, when the image blur correction starts, the image blur correction is performed by storing the position information before the drive unit is driven, and using the detection signal with the position information to serve as a reference position, and wherein, when a drive command that is different from the command for the image blur correction is received during the execution of the image blur correction, the correction amount calculated based on the detection signal is added to the position information, and a value obtained by adding a drive amount in one cycle of the image blur correction process, which has been calculated based on a drive speed of the drive unit by the drive command and a cycle for performing the image blur correction process, is set as the drive target value of the drive unit.

* * * * *